Jan. 7, 1958  E. E. HUPP  2,818,835
POWER ASSISTED MASTER CYLINDER
Filed Jan. 9, 1952
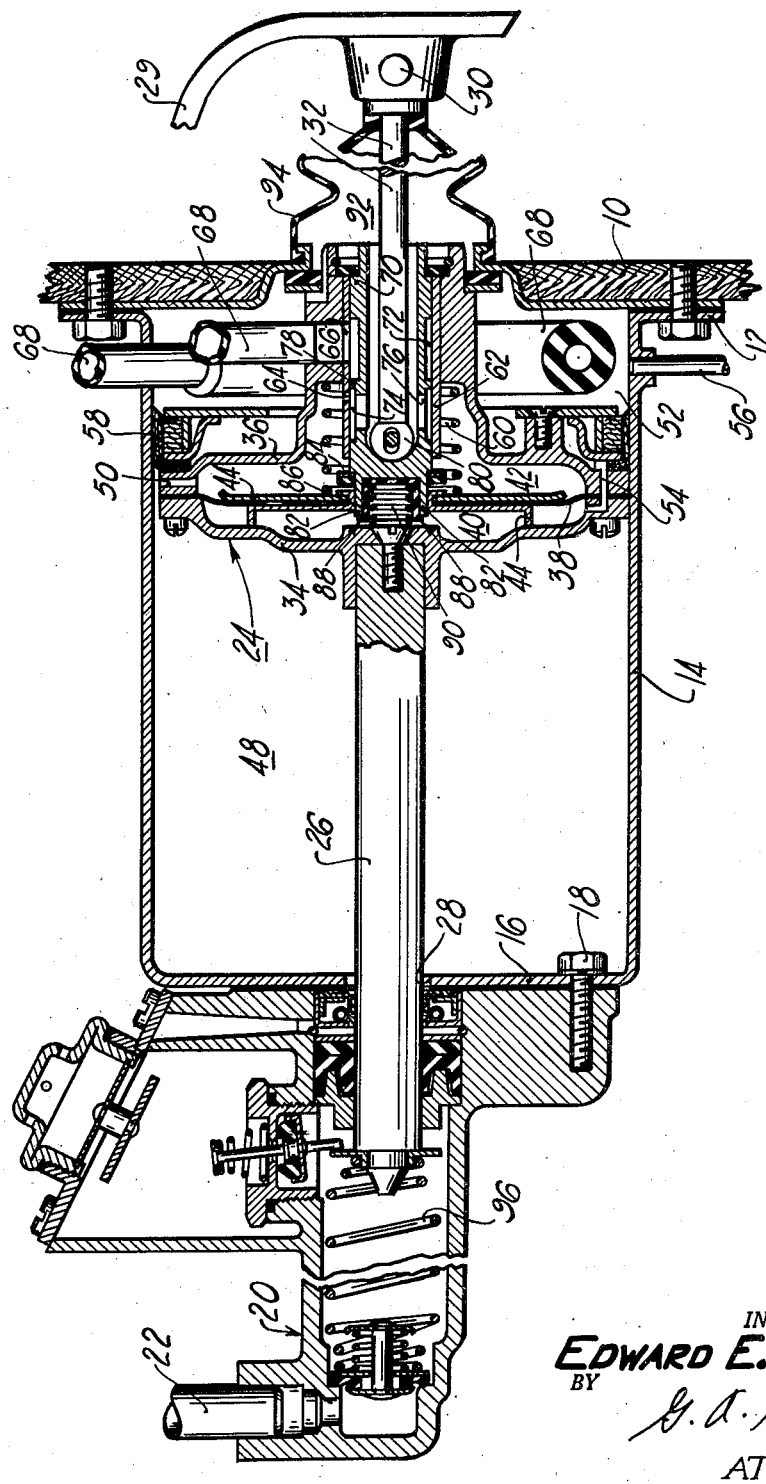
INVENTOR.
EDWARD E. HUPP
BY
G. A. Gust
ATTORNEY United States Patent Office 2,818,835
Patented Jan. 7, 1958

2,818,835
POWER ASSISTED MASTER CYLINDER

Edward E. Hupp, South Bend, Ind., assignor to Bendix Aviation Corporation, South Bend, Ind., a corporation of Delaware Application January 9, 1952, Serial No. 265,563

12 Claims. (Cl. 121—41)

The present invention relates to a power assisted master cylinder and more particularly to an actuating device therefor.

The present invention constitutes an improvement over the invention disclosed and claimed in Price application Serial No. 167,681 filed June 12, 1950, now Patent 2,685,170. Both inventions are directed to the provision of a power brake device which enables the use of a brake treadle instead of the conventional brake pedal (the treadle having approximately only one-half the available travel as the pedal) in the operation of vehicle brakes. In conventional brake systems, operation of the brakes has required that the operator lift his foot from the accelerator, for example, and place it on the brake pedal. In the use of a treadle, the operator need only pivot his foot on the heel to operate either the accelerator or brakes. The advantages inherent in this new brake system have already been enumerated in said Price application so will not be mentioned here.

In making the change from the pedal to the treadle, certain problems have been encountered, one of which is to achieve substantially the same "feel" when applying the brakes by means of the treadle as is obtained when applying the brakes of a conventional, pedal controlled system. In the use of the invention of the aforesaid Price application, this pedal "feel" was substantially duplicated; however, momentary, unnatural "feel" has been experienced in the sense that the treadle tends to drop to the floorboard during the initial part of the treadle brake-applying movement.

It is, therefore, an object of this invention to overcome the above-described unnatural "feel" of the former invention.

It is a further object to provide a brake-actuating device which will produce a reaction or "feel" for the operator thereby enabling him to accurately gauge the degree to which the brakes have been applied.

It is a still further object to provide a power device for operating the master cylinder of a brake system which will react against the operator with a force proportional to the force generated in the master cylinder.

Other objects will become apparent as the description proceeds.

In the drawing, the figure is a sectional view of an embodiment of the present invention in its released or unactuated position.

Referring to the drawing, the illustrated power assisted master cylinder of this invention is suitably secured to the toeboard or firewall 10 of the vehicle by means of a radially outwardly extending flange 12 formed on one end of a power cylinder casing 14. On the other end 16 of power cylinder 14 is secured by a suitable means, such as the screw 18, a hydraulic cylinder 20 which is provided with an outlet 22 for connection to the wheel cylinders of a conventional hydraulic brake system. A power piston 24 is reciprocably carried inside power cylinder 14. A plunger or pressure-transmitting member 26 is coaxially secured to said piston 24 and projects through an opening 28 in power cylinder end 16 into the hydraulic cylinder 20. Thus it is seen that by movement of piston 24 to the left, plunger 26 is driven more deeply into hydraulic cylinder 20 and displaces fluid through the outlet 22.

Operation of the present invention may be accomplished by means of a treadle 29 which is suitably pivoted on the floorboard 10 (this connection is not shown) and which is also pivotally connected at 30 to a connecting rod 32 having an operative connection with piston 24. By depressing treadle 29, the connecting rod 32 will be forced to the left and will in turn advance piston 24 to the left causing plunger 26 to displace liquid from hydraulic cylinder 20. While this particular operation is possible, it is not to be confused with the normal desired operation in which the treadle 29 is used only to actuate a power device which will cause actuating movement of piston 24. This described manual operation is available in case the power mechanism should fail.

Continuing now with the detailed description of the present invention, the piston 24 is comprised essentially of two sections 34 and 36 which are joined at their outer peripheries in such a manner as to provide an internal piston cavity. A diaphragm 38 is clamped between the two piston sections 34 and 36 in such a manner as to define two variable volume piston compartments 40 and 42. The central portion of diaphragm 38 is clamped between a couple of stiffening plates 44 thereby providing a flexible, annular outer peripheral portion by which said diaphragm 38 can move relative to piston 24. Compartment 42 is in continuous communication with the power chamber 48 in front of piston 24 by means of a passage 50, and compartment 40 is constantly connected with the rear power chamber 52 by means of a suitable passage 54. Chamber 52 is ported to atmosphere by means of the inlet conduit 56. A leather or the like seal 58 is carried on the outer periphery of piston 24 to prevent the leakage of fluid pressure past piston 24.

A counter-reaction spring 60 is interposed between the rear portion of piston 24 and diaphragm 38 to bias said diaphragm against the front portion of piston 24.

A cylindrical sleeve 62 is coaxially secured into the rear portion of piston 24 and is ported at 64 for communication with compartment 42 and at 66 for communication with a vacuum conduit 68. A slide valve 70 is reciprocably positioned inside sleeve 62 and is provided with annular passage 72 for communication, at all times, with vacuum inlet 66 and another annular passage 74 for communication with port 64 and the atmosphere by means of radial opening 76. A land 78 separates the two valve passages 72 and 74.

The end 80 of connecting rod 32 is in thrust engagement with slide valve 70 for operating same.

The front end 82 of slide valve 70 is fitted into a companion central opening in diaphragm 38 in such a manner that the valve and diaphragm are relatively movable. The sliding connection between the valve and the diaphragm is of such a nature as to allow free movement between the two parts but not so large as to allow leakage between the compartments 40 and 42 which will prevent a differential pressure from being imposed on diaphragm 38. An abutment washer 84 is set against the shoulder defined by the reduced valve end 82 and is engageable in sealing relation with the diaphragm 38. As shown, the counter-reaction spring 60 biases the diaphragm 38 against the front portion of piston 24 so as to provide a slight clearance between diaphragm 38 and the washer 84 for a purpose which will become apparent hereafter.

The end 82 of the valve 70 is counterbored to receive a cup-shaped rubber cushion 86 provided with a radial flange 88 which overlaps the exposed end of the valve. This flange 88 serves as a cushioning medium between end 82 and the front portion of piston 24 if the two should come into contact thereby eliminating objectionable clicking sounds. A helical spring 90 is inserted into the recessed portion of the rubber cup 86 and acts against the front of piston 24 to urge the valve 70 toward the rear and released position (as illustrated).

In released or unactuated condition, compartment 40 and chamber 52 are in communication with the atmosphere by means of the inlet conduit 56. Likewise, compartment 42 and chamber 48 are at atmospheric pressure by reason of the communication with the atmosphere through port 64.

In operation, the treadle 29 is depressed advancing valve 70 toward the left until land 78 passes port 64 thereby establishing vacuum communication between ports 64 and 66. The pressures in compartment 42 and chamber 48 will now be reduced, and the differential pressure developed over piston 24 causes it to move toward the left. Assuming the treadle 29 to be held in a fixed position after the initial operation, the piston 24 will move until land 78 completely covers port 64 thereby severing further vacuum communication to compartment 42 and chamber 48. The valve 70 is now in lapped position. Further movement of treadle 29 toward the left will result in piston 24 moving on its power stroke a corresponding amount.

As a differential pressure is being produced over the piston 24, a like unit pressure is being developed over the diaphragm 38. This latter pressure tends to move the diaphragm toward the right against force of the spring 60. When this differential unit pressure attains a predetermined value, the force of the spring 60 will be overcome thereby allowing relative movement to take place between the diaphragm 38 and the valve 70. This movement is in a direction whereby the diaphragm 38 will engage the abutment washer 84 tending to thrust the valve 70 toward the right. When this occurs, a reaction or "feel" is produced which the operator of the treadle 29 must counteract if the brakes are to be maintained in applied condition. Thus, with each incremental brake-applying movement of treadle 29, a corresponding reaction force will be developed by diaphragm 38 which opposes such brake-applying movement. Since the same unit differential pressures act on both the piston 24 and the diaphragm 38, and the diaphragm 38 has an effective area smaller than that of piston 24, the reactionary force felt by the operator will be directly proportional to the actuating force exerted by the piston 24.

It is desirable that the initial brake-applying movement of treadle 29 not be resisted by the diaphragm 38. The counter-reaction spring 60, interposed between piston 24 and the diaphragm 38, serves to prevent the initial reaction of diaphragm 38 from being imparted to the valve 70.

A suitable differential pressure at which the diaphragm 38 will overcome the spring 60 and thereby engage the abutment washer 84 is that pressure at which the shoe-to-drum clearance of the brakes will be taken-up.

It is to be noted that both ends of the valve 70 are exposed to the same atmospheric pressure. The left-hand end of the valve, being in compartment 40, is acted upon by the atmospheric pressure entering chamber 52, and the right-hand end of the valve 70 is constantly acted upon by atmospheric pressure to which it is exposed inside a corrugated rubber dust shield 94. Thus, at no time during the operation of the invention is a differential pressure developed over the ends of the valve, or as a corollary, the operating pressures will not bear any appreciable direct influence on the valve tending to move it in either direction. It may be stated here that since the end 82 of valve 70 is slightly reduced, a differential pressure will be developed over the ends of valve 70 but is unobjectionable because of its minute value.

In previous similar constructions, the diaphragm 38 did not have a central opening, but instead had a sealed central portion normally spaced from the left-hand end of the valve 70 which was, therefore exposed to the pressure prevailing in compartment 42. Thus, it is seen that prior to actuation, the left-hand end of the valve would be subjected to the atmospheric pressure in compartment 42, but immediately following initial actuation, this end would be exposed to the reduced pressure in compartment 42, whereby a differential pressure over valve 70 resulted tending to move this valve toward the left. Since this tendency of valve 70 to move was in the same direction as the operator will normally move treadle 29, it is seen that the operator's efforts would be assisted, and the treadle 29 would tend to "drop away" from the operator's foot. This "dropping away" action produced an unnatural "feel" which the present invention obviously eliminates.

Release of the brakes is effected by merely removing the foot from treadle 29 whereupon a compression spring 96 and the developed pressure in master cylinder 20 will act to move the plunger 26 and the associated piston mechanism to the right and released position. Spring 90 acting between the front portion of piston 24 and the left end of valve 70 returns valve 70 to its released position as illustrated.

Although only one embodiment of the invention has been illustrated and described, various changes in the form and relative arrangements of the parts may be made to suit requirements.

I claim:

1. For use with a power assisted master cylinder, an actuating device comprising a cylinder, a piston dividing said cylinder into first and second variable volume chambers, a diaphragm dividing the interior of said piston into first and second variable volume compartments, the first chamber and the second compartment being in constant communication, the second chamber and the first compartment being in constant communication, a follow-up slide valve reciprocably carried by the rear of said piston and extending through the second compartment and a central opening in said diaphragm and into the first compartment, said diaphragm and said valve being relatively movable, a rubber cushion positioned on the end of said valve adjacent the front of said piston, a valve return spring interposed between the front of said piston and the adjacent end of said valve, a counter-reaction spring acting between the rear of said piston and said diaphragm, and a manually operable valve-actuating member operatively connected to said valve whereby the differential pressures over said piston and said diaphragm respectively may be controlled and said piston may be moved manually by means of said valve-actuating member, said diaphragm being arranged to react against said valve in opposition to valve actuating movement only after a predetermined differential pressure over said diaphragm has been attained.

2. For use with a power assisted master cylinder, an actuating device comprising a cylinder, a piston dividing said cylinder into first and second variable volume chambers, a diaphragm dividing the interior of said piston into first and second variable volume compartments, the first chamber and the second compartment being in constant communication, the second chamber and the first compartment being in constant communication, a follow-up slide valve reciprocably carried by the rear of said piston in a manner such as to extend through the second compartment and a central opening in said diaphragm and into the first compartment, said diaphragm and said valve being relatively movable, a valve return spring interposed between the front of said piston and the adjacent end of said valve, a counter-reaction spring acting between the rear of said piston and said diaphragm, and a manually operable valve-actuating member operatively connected to said valve whereby the differential pressures over said piston and said diaphragm respectively may be controlled and said piston may be moved manually by means of said valve-actuating member, said diaphragm being arranged to react against said valve in opposition to valve actuating movement only after a predetermined differential pressure over said diaphragm has been attained.

3. For use with power assisted master cylinder, an actuating device comprising a cylinder, a piston dividing said cylinder into first and second variable volume chambers, a diaphragm having a central opening therethrough and dividing the interior of said piston into first and second variable volume compartments, said first compartment being in communication with the second chamber and said second compartment being in communication with the first chamber, a valve reciprocably carried by the rear portion of said piston and projecting through the diaphragm opening into abuttable spaced relation with the front portion of said piston, said valve being relatively movable with respect to said diaphragm, a valve return spring urging said valve away from the aforesaid front piston portion, a counter-reaction spring urging said diaphragm toward said front piston portion, and a manually operable valve-actuating member operatively connected to said valve whereby the differential pressures over said piston and said diaphragm respectively may be controlled and said piston may be moved manually by means of said valve-actuating member, said diaphragm being arranged to react against said valve in opposition to valve actuating movement and the force of said counter-reaction spring only after a predetermined differential pressure over said diaphragm has been attained.

4. For use with a power assisted master cylinder, an actuating device comprising a cylinder, a piston dividing said cylinder into first and second variable volume chambers, a diaphragm having a central opening therethrough and dividing the interior of said piston into first and second variable volume compartments, said first compartment being in communication with the second chamber and said second compartment being in communication with the first chamber, a valve reciprocably carried by the rear portion of said piston and projecting through the diaphragm opening into abuttable spaced relation with the front portion of said piston, said valve being relatively movable with respect to said diaphragm, a counter-reaction spring urging said diaphragm toward said front piston portion, and a manually operable valve-actuating member operatively connected to said valve whereby the differential pressures over said piston and said diaphragm respectively may be controlled and said piston may be moved manually by means of said valve-actuating member, said diaphragm being arranged to react against said valve and said counter-reaction spring in opposition to valve actuating movement only after a predetermined differential pressure over said diaphragm has been attained.

5. For use with a power assisted master cylinder, an actuating device comprising a piston having front and rear portions, a diaphragm dividing the interior of said piston into first and second variable volume compartments and having a central opening therethrough, the first compartment being in communication with a substantially constant pressure, the second compartment being in communication with a controlled pressure which acts on the front portion of said piston, a valve reciprocably carried by the rear portion of said piston and projecting through the diaphragm opening into abuttable relation with the front portion of said piston, and a counter-reaction spring urging said diaphragm toward said front piston portion, said valve being operable to cause the development of the same differential unit pressures over said piston and said diaphragm and being reacted upon by said diaphragm only after a predetermined differential pressure over said diaphragm has been attained.

6. For use with a power assisted master cylinder, an actuating device comprising a first pressure responsive movable member having front and rear portions, a second pressure responsive member dividing the interior of said first member into first and second compartments and having an opening therethrough, the first compartment being in communication with a substantially constant pressure, the second compartment being in communication with a controlled pressure which acts on the front portion of said first member, an actuating member carried by said first member and extending through the opening of said second member into abuttable relation with the front portion of said first member, and yieldable counter-reaction means urging said second member toward the front portion of said first member, said actuating member being operable to cause the development of the same differential unit pressures over both said first and second pressure responsive movable members, said actuating member being reacted upon by said second member only after a predetermined differential pressure over said second member has been attained.

7. For use with a power assisted master cylinder, an actuating device comprising a first pressure responsive movable member adapted to be subjected on its rear side to a substantially constant pressure and on its front side to a controlled pressure, a second pressure responsive movable member which divides the interior of said first member into two compartments and which is provided with an opening therethrough, the first compartment being in communication with said constant pressure and said second compartment being in communication with said controlled pressure, an actuating member carried by said first member and projecting through the opening of said second member whereby the opposite ends of said actuating member are subjected to said constant pressure, and yieldable counter-reaction means urging said second member toward the front portion of said first member, said actuating member being operable to cause the development of the same differential unit pressures over both said first and second pressure responsive movable members, said actuating member being reacted upon by said second member only after a predetermined differential pressure over said second member has been attained.

8. For use with a power assisted master cylinder, an actuating device comprising a first pressure responsive movable member adapted to be subjected on its rear side to a substantially constant pressure and on its front side to a controlled pressure, a second pressure responsive movable member operatively associated with said first member and having an opening therethrough, the front side of said second member being subjected to said constant pressure and the rear side of said second member being subjected to said controlled pressure, an actuating member carried by said first member and projecting through the opening of said second member whereby the opposite ends of said actuating member are subjected to said constant pressure, and yieldable counter-reaction means urging said second member toward the front portion of said first member, said actuating member being operable to cause the development of the same differential unit pressures over both said first and second pressure responsive movable members, said actuating member being reacted upon by said second member only after a predetermined differential pressure over said second member has been attained.

9. For use with a power assisted master cylinder, an actuating device comprising a first pressure responsive movable member adapted to be subjected on its rear side to a substantially constant pressure and on its front side to a controlled pressure, a second pressure responsive movable member operatively associated with said first member and having an opening therethrough, the front side of said second member being subjected to said constant pressure and the rear side of said second member being subjected to said controlled pressure, and an actuating member carried by said first member and projecting through the opening of said second member whereby the opposite ends of said actuating member are subjected to said constant pressure, said actuating member being operable to cause the development of the same differential unit pressures over both said first and second pressure responsive movable members, said actuating member being reacted upon by said second member only after a predetermined differential pressure over said second member has been attained.

10. For use with a power assisted master cylinder, an actuating device comprising a first pressure responsive movable member adapted to be subjected on one side to a substantially constant pressure and on the other side to a controlled pressure, a second movable member carried by said first member and being adapted to provide a reactive force generally proportional to the force exerted upon said first movable member, a control valve carried by said first member for regulating differential pressure across said first movable member, a control element mounted in said control valve, means causing opposite ends of said control element to be subjected to said constant pressure, said second movable member being adapted to deliver its reactive force to said control element, and means preventing a predetermined amount of said reactive force of said second movable member from being delivered to said control element; whereby valve actuating movement is accomplished in two stages, the first of which is not influenced by changes in the control valve's discharge pressure.

11. In a fluid pressure-responsive actuator as set forth in claim 9 wherein the portion of said one end of the actuating member has mounted thereon sealing means in abutting relationship to said second pressure-responsive movable member.

12. In a fluid pressure-responsive actuator, a power cylinder, a hollow pressure-responsive movable wall in the power cylinder operative to be urged in a first direction by a pressure differential thereon, a pressure-responsive reaction member supported in said movable wall operative to be proportionally urged in a direction opposite to that which the movable wall is to be urged due to said pressure differential, an operator-operated control member reciprocably supported by said movable wall and extending through said reaction member for controlling pressure-differential in the pressure-responsive actuator, and for transmitting reaction force to the operator of said device, the control member including two end portions influenced by a substantially constant pressure at all times, one end portion thereof being reciprocable in said reaction member and defining therewith two chambers in the movable wall, one chamber being subject to a constant pressure and the other chamber being subject to a control pressure during actuation of said actuator, and means on the one end of said control member operative to abut said reaction member for maintaining the substantially constant pressure on the end portions of said control member at all times.

No references cited.